Feb. 23, 1960 E. UMBRICHT ET AL 2,925,614
AUTOMATIC APPARATUS FOR WASHING FABRICATED PARTS
Filed April 25, 1956 4 Sheets-Sheet 2

INVENTORS
EMIL UMBRICHT
DEWEY M. EVANS
WILLARD JOHNSON
BY Curtis, Morris & Safford
ATTORNEYS Feb. 23, 1960 E. UMBRICHT ET AL 2,925,614
AUTOMATIC APPARATUS FOR WASHING FABRICATED PARTS
Filed April 25, 1956 4 Sheets-Sheet 3

INVENTORS
EMIL UMBRICHT
DEWEY M. EVANS
WILLARD JOHNSON
BY Curtis, Morris & Safford
ATTORNEYS

United States Patent Office 2,925,614
Patented Feb. 23, 1960

2,925,614

AUTOMATIC APPARATUS FOR WASHING FABRICATED PARTS

Emil Umbricht, Jackson, Dewey M. Evans, Plymouth, and Willard L. Johnson, Royal Oak, Mich., assignors to Ajem Laboratories, Inc., Livonia, Mich., a corporation of Michigan Application April 25, 1956, Serial No. 580,528

17 Claims. (Cl. 15—21)

The present invention relates to improved power washing apparatus adapted for use in industrial applications for automatically handling and thoroughly cleaning the interiors and exteriors of various manufactured articles. This invention provides greatly increased efficiency and thoroughness in cleaning fabricated parts or assemblies having long tubular passages. It enables a thorough removal of all traces of the soil materials which usually accumulate during the previous manufacturing operations.

The illustrative embodiment of this invention described herein is particularly well suited for use in the automotive industry and in other heavy equipment mass-production industries wherein metal parts and housings having a generally elongated and/or tubular configuration are fabricated.

The improved power washing apparatus specifically described in this application is an automatic axle housing washing machine adapted for automatically cleaning and handling the rear axle housings of automotive vehicles.

It is an object of the present invention to provide improved automatic power washing apparatus for handling and cleaning fabricated parts and housings having a generally elongated and/or tubular configuration. It is an advantage of the present invention that it enables a manufacturer automatically to obtain a thorough cleaning out and scrubbing of the interior of such fabricated parts, and in particular of rear axle housings, and the like, and assures a uniformly high quality in each completed assembly.

The rear axle housings in modern automotive equipment are customarily formed with an enlarged central casing for enclosing the differential. Two long tubular shaped casings project out from either side of the differential housing for surrounding and protecting the axles which run from the differential out to the two rear wheels. In some automotive designs, the differential housing itself has a generally hemispherical shape. In others, the differential housing has a generally drum shape, appearing somewhat like the sounding box of a banjo, and such housings are often referred to as "banjo" housings. The illustrative embodiment of the present invention is very well suited for use in cleaning such various types of rear axle housings as will be understood from the following description.

In the fabrication of such various types of rear axle housings it is common practice to form them in two halves. A pair of seams run out along opposite sides of each of the tubular casings, and these seams pass around opposite sides of the differential housing itself. These two halves of the axle housing are welded together during fabrication to form the completed unit.

After the welding operation has been completed, it is necessary to remove the accumulated soil materials and foreign particles which have accumulated on the interior and outer surfaces of the axle housing during all of the previous manufacturing steps. These soil materials and particles often include such things as metal chips and filings, various greases and cutting oils, and sometimes even coolant materials and the waxy lubricants used in stamping and drawing are present. Dirt and dust particles adhere to these coatings. In addition, the welding operation itself usually causes deposits of the welding flux and creates metal and oxide flakes that are more or less tightly fused to the inner and outer surfaces of the axle housing in near the welded seams.

In the past these types of axle housings have usually been washed by hand. The use of kerosene or other inflammable solvents was common practice in an effort to reduce the amount of the various soil materials clinging within the housings. This hand washing operation created a continuing fire hazard. Moreover, hand washing even under the best conditions, was a slow process and, in many cases, failed to remove much of the soil material, resulting in damage to the differential and rear axle bearings.

Common experience has shown that many different types of automotive vehicles, after they have been driven several thousand miles, begin to develop a type of humming or grinding sound in the differential and rear axle drive. It has usually been assumed that this type of noise is a natural result of the inevitable wear which must occur after a vehicle has been driven these distances. Recent tests have proven that much of this hum is caused by residues of materials that were present in the axle housing at the time it was fabricated and not completely removed. Wide variations in temperature occur during operation of a vehicle over a period of several months. These temperature changes, combined with the action of the lubricating oils, loosens the particles adhering within the rear axle housing and cause excessively rapid wear. Tests have shown that when the rear axle housings are thoroughly cleaned out after fabrication and the gears and bearings assembled in them are similarly thoroughly cleaned, then the rear end drives operate over greatly extended periods without developing such humming noises and that the total life of the drive is markedly prolonged.

It is among the advantages of the present invention that it enables such a thorough cleaning on a mass-production scale of the rear axle housings of automotive vehicles that the life of the differential and rear axle drives are greatly extended in operation. These drives turn out to be much quieter in use over much longer periods of time. Moreover, the automatic axle housing washing apparatus described herein removes substantially all fire hazard in operation. It enables a thorough cleansing of the axle housing, both the differential section and the two tubular axle casings to be obtained with aqueous type washing solutions incorporating non-flammable solvents. Substantially all of the hand labor formerly required is saved, while the total production of axle housings is greatly speeded up.

Another advantage of the apparatus described herein are those resulting from the fact that each individual axle housing is precisely advanced in sequence from station to station through the apparatus. This movement of the axle housings is provided by transfer apparatus which accurately positions and holds each of the axle housings in each of the various stations for optimum cleaning action. Advantageously, this transfer apparatus enables the use of high speed scrubbing brushes which are inserted into the differential section and axle casing sections for thoroughly cleansing them all out. Included in the transfer mechanism is a pair of bifurcated arms which grip each axle housing on opposite sides of the differential section so as to precisely align and hold the axle housing in position for the various cleaning operations to take place.

Another advantage of the machine described herein is the provision of scrubbing and flushing carriage assemblies which simultaneously scrub out both tubular axle casings on one axle housing while flushing out one or more adjacent axle housings.

The various aspects, features, objects and advantages of the present invention will be more fully understood from a consideration of the following description in conjunction with the accompanying drawings, in which:

Figure 1:
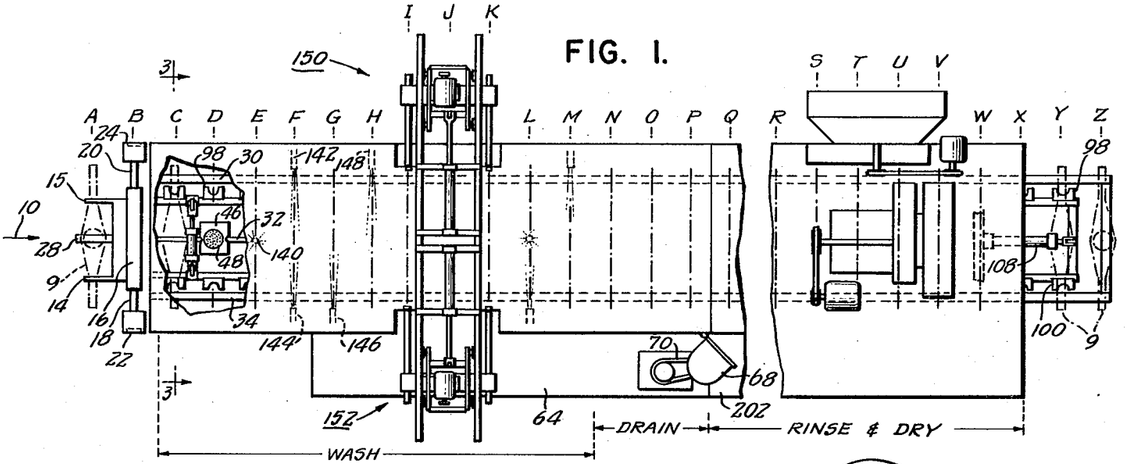
Figure 1 is a top view of an automatic machine for handling and washing the rear axle housings of automotive vehicles, with portions of the machine being shown as broken away in order to illustrate the operation more clearly.
Figure 2:
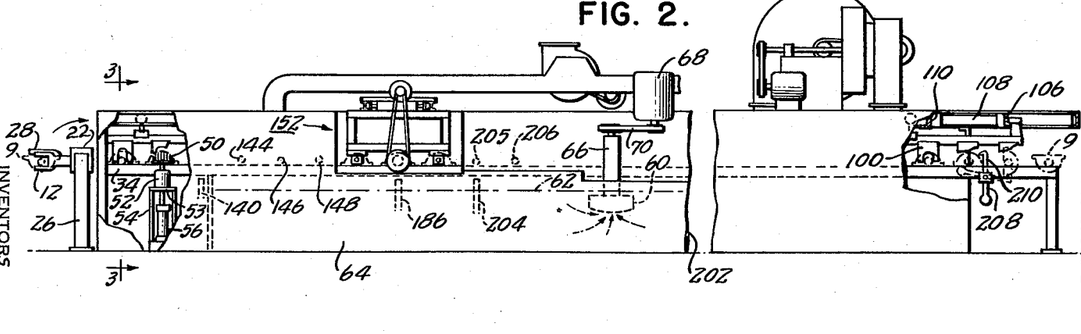
Figure 2 is an elevational view of the machine shown in Figure 1.
Figure 3:
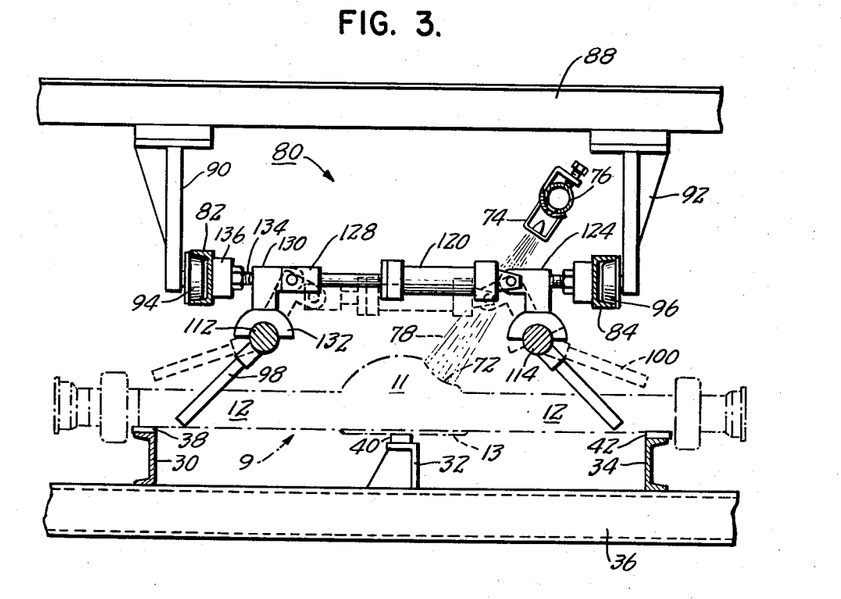
Figure 3 is a cross sectional view taken through the machine of Figures 1 and 2, generally along the lines 3—3 looking toward the right, and showing on enlarged scale the operation of the transfer mechanism.
Figure 4:
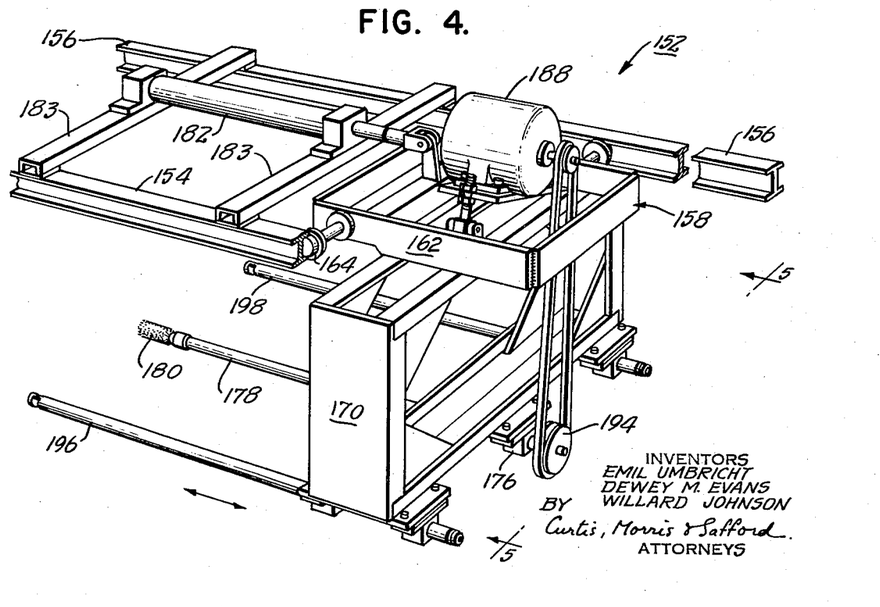
Figure 4 is a partial perspective view of one of the scrubbing and flushing carriages on opposite sides of the machine of Figure 1 and being shown on enlarged scale.
Figure 5:
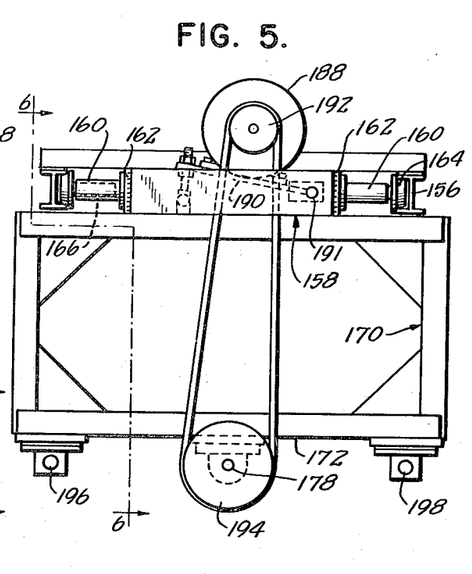
Figure 5 is an end view of the carriage of Figure 4 as seen looking from the lower right corner of the drawing upwardly toward the left, as shown by the arrows 5—5.
Figure 6:
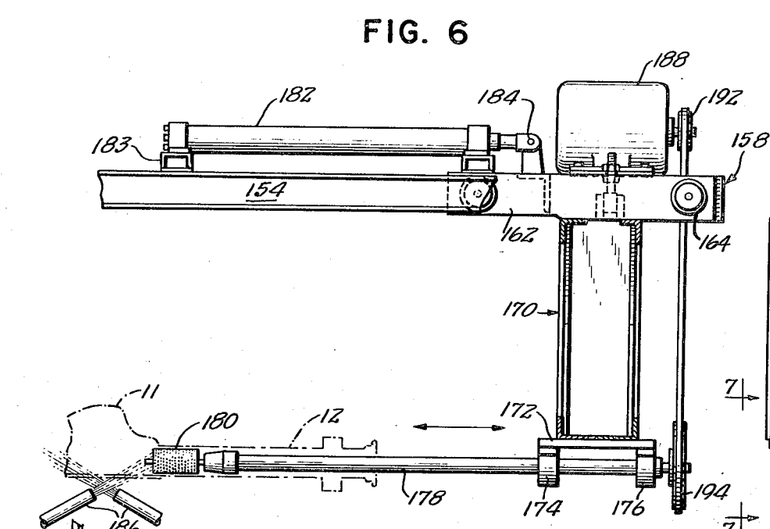
Figure 6 is a longitudinal sectional view of this carriage as seen taken generally along the line 6—6 in Figure 5, looking to the right.
Figure 7:
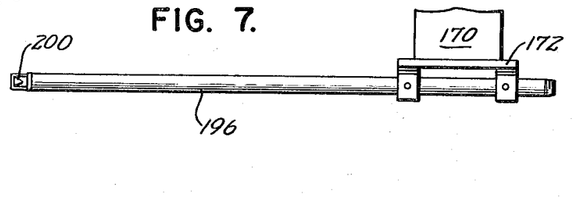
Figure 7 is a partial sectional view of this carriage as seen taken along the line 7—7 of Figure 5 looking toward the right.

Referring in greater detail to Figures 1 and 2 of the drawings, the overall operation of the automatic axle housing washing machine shown therein as an illustrative embodiment of the present invention is as follows: The rear axle housings 9, illustrated by dashed outlines, come from the assembly line at the left as shown by the arrow 10. Referring briefly to Figure 3, it is seen that these axle housings 9 each include a generally hemispherical central differential housing section 11 and a pair of generally elongated and tubular axle casing sections 12. One side of the differential housing is machined flat, as shown at 13 in Figure 3, and has a large circular opening in it (not shown) which is sometimes covered by a plate bolted in place around it's perimeter when the axle housing is installed. This opening is herein called the cover plate opening, and when the axle housings are received from the assembly line at 9, this flat cover plate surface is facing upwards. In many vehicles the surface 13 is secured to a housing instead of a cover plate, and then the drive shaft or torque tube extends into the differential housing 11 through this housing which is secured to the surface 13.

These axle housings 9 are received one at a time by the machine at a first station labelled A for reference. They are picked up by a pair of bifurcated arms 14 and 15 which straddle each of the tubular axle casings 12 on opposite sides of the differential housing 11 and swing the axle housing up and over, passing through a station B without stopping. Each unit is thus placed in a station C with the cover plate opening facing downwardly. From station C the axle housings are advanced along three rails by means of a transfer mechanism. They pass in sequence through a large number of stations labelled D through Z for reference. In the initial stations C through M various washing and scrubbing operations take place, as explained in detail later. Then in stations N through P the washing solutions are allowed to drain out of the axle housings. In stations Q through X the axle housings are rinsed off by high pressure jets of aqueous solution including rust inhibiting compounds and then are dried off by blasts of hot air directed onto the axle housings from suitably positioned groups of air nozzles. These are arranged to produce the most effective action in blowing away any liquid from the exterior and interor surfaces of the axle housing and in evaporating any remaining traces of moisture.

In passing from station X through station Y to station Z, the axle housings are automatically flipped over again into their initial positions with the cover plate opening facing upwardly in readiness to be carried along further into the next section of the assembly line.

In station A, the axle housing being received slides toward the right into the slots in the bifurcated arms 14 and 15 projecting from opposite ends of a cross frame 16. This frame is supported at each end by a pair of shafts 18 and 20 which are mounted in torque drive units 22 and 24, respectively, supported upon uprights 26.

In addition to the bifurcated arms 14 and 15, a central arm 28 projects from the frame 16 and closely overlies the flat cover plate surface 13 in the differential housing. This arm 28 prevents the axle housing from rotating in the slots of the arms 14 and 15 as it is swung up and over through station B and deposited in station C in inverted position. The torque units 22 and 24 may conveniently be hydraulic torque motors of the type known in the trade as single vane torque motors such as are available commercially from The Bonnot Company of Canton, Ohio. These are arranged to give 180° of movement and return. The hydraulic valves controlling these torque motors are operated by a suitable hydraulic control system under the control of solenoid-operated valves. A master electric control circuit assures the proper timing of each operation. Such a control system is disclosed in the copending application Serial No. 467,746, filed November 9, 1954, filed jointly in the names of two of the present inventors, Emil Umbricht and Dewey Evans.

In order to support the axle housings as they are moved through the washing machine from station to station, three tracks 30, 32, and 34 (see also Figure 3) extend the full length of the machine and constitute guide means for the moving work. The outside tracks 30 and 34 conveniently project out at the delivery end of the machine in stations Y and Z. These three tracks are supported on suitably placed cross beams 36, and include respective wearing rails 38, 40 and 42 of hardened steel. The central track 32 extending along their upper faces. The central track 32 and its wearing rail 40 are adapted to engage the flat cover plate surface 13 as the axle housing moves along the outer tracks to prevent its rolling over.

In order to give an initial scrubbing and buffing action to the inside of the differential housing 11 proper, the center guide rail 32 is interrupted in station D. A large flat plate 46 serves to prevent the axle housing from turning over. This plate 46 includes a circular opening 48 slightly larger than the cover plate opening in the axle housing itself. And below the opening 48 aligned with it is positioned a hemispherical brush 50. This brush is shown in Figure 2 in its raised position. It is rotated by means of a totally enclosed electric motor 52 which is mounted on an elevator platform 53 arranged to slide up and down on a plurality of vertical guides 54. A hydraulic cylinder 56 positioned below the platform 53 is arranged to raise the brush up through the opening 48 so as to scrub the interior of the differential housing portion of each axle housing in succession as it reaches station D. The hydraulic cylinder 56 is controlled by the master electric circuit so as to move up only when the transfer mechanism is stationary and holding the axle housing in proper position over the hole 48.

At this station D there are a number of high pressure spray nozzles connected through pipes to high pressure manifolds supplied with washing solution from a non-clogging high pressure centrifugal pump 60. The pump casing is totally immersed below the liquid level 62 in a side tank 64. The pump includes a vertical drive shaft extending up through a housing 66 with a pulley at the top driven by a powerful electric motor 68 through a V-belt drive 70. This type of rugged non-clogging pump is disclosed in great detail and claimed in the copending application Serial No. 357,450, filed in the name of Emil Umbricht, on May 26, 1953.

The spray nozzles used are desirably ones with bullet-shaped spray forming directors of the type disclosed and claimed in a copending application of Emil Umbricht, Serial No. 334,420, filed February 2, 1953, now U.S. Patent No. 2,778,685, issued January 22, 1957.

Thus, the washing solution is sprayed forcefully onto the axle housing in station D. These jets of the washing liquid may also be directed onto the rotating brush 50, but satisfactory cleaning is also accomplished with a wire bristle brush operating dry. In this way the brush is kept saturated with washing solution and thoroughly cleans the inside of the differential casing when it is raised. Moreover, it is to be noted that the differential housing may include a second smaller opening at 72 on the opposite side from the cover plate opening. This smaller opening is adapted to receive the end of the torque tube when the axle housing is installed on certain types of vehicles. In station D one of the washing spray jets, which can be seen in the background at 74 in Figure 3 mounted on a pipe 76 is aimed downwardly and toward the left so that the stream 78 passes into the housing 11 through the opening 72 and maintains the brush 50 saturated with washing solution while it rotates in this housing.

Figure 8:
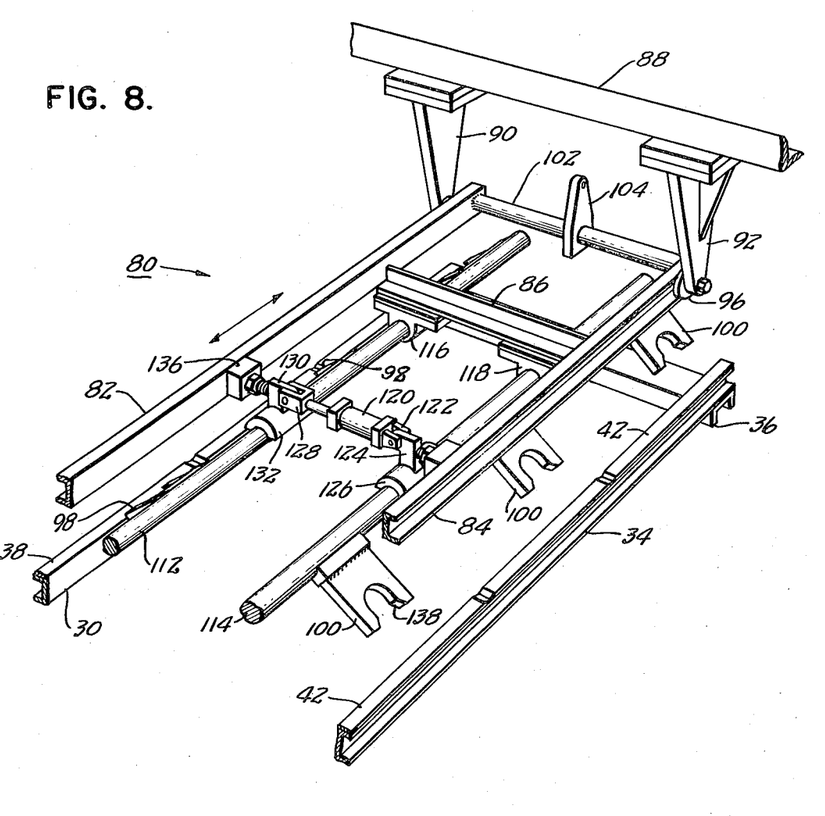
Figure 8 is a partial perspective view of the transfer mechanism.

In order to advance the axle housings from station to station through the machine and to hold them accurately positioned in each station, an improved transfer mechanism generally indicated at 80 in Figures 3 and 8 is utilized. This transfer mechanism includes a pair of channel-shaped runners 82 and 84 extending the length of the machine. These runners are held in rigidly spaced relationship by a plurality of angle-iron cross braces, such as the cross brace 86 in Figure 8 which is welded at each end to the backs (i.e. opposed surfaces) of the webs of the runners 82 and 84. These runners and cross braces advantageously form the main frame of the transfer apparatus.

To support these runners for longitudinal motion, a plurality of cross beams, such as the beam 88 in Figures 3 and 8, extend across the width of the machine near the top. Pairs of triangular support brackets 90 and 92 project down from each of these cross beams, and each carries a flanged tapered roller 94 and 96, respectively, at its lower apex. These rollers project into the respective channel troughs of the runners 82 and 84 and allow the runners to ride back and forth longitudinally in operation. Among the advantages of this transfer mechanism with the rollers projecting into the channel runners is that they also resist upward motion of the transfer frame with respect to the brackets 90 and 92. Thus, the pairs of forked dogs 98 and 100 are enabled to bear down firmly upon the axle casing sections 12 as shown by the solid-line position of these dogs in Figure 3. In this way the axle housings are gripped firmly when being moved from station to station and are held securely and accurately in position for washing and scrubbing in each station when the transfer mechanism is stationary.

In order to reciprocate the channel runners 82 and 84 longitudinally a cross bar 102 is rigidly secured between them at the discharge end of the machine with a rigidly attached upstanding clevis drive arm 104. The upper end of this drive arm is pinned between a clevis at the end of a piston rod 106 (see also Figures 1 and 2) which is reciprocated by a hydraulic cylinder 108 having its base end secured to a cross member 110 in the machine.

In operation of the transfer mechanism, the channel runners 82 and 84 are driven toward the intake end of the machine. Then this movement is stopped with the respective forked dogs 98 and 100 aligned in positions over the axle housings in the respective stations C through Y. Then the forked dogs are swung down into straddling engagement with the respective axle casings 12. With these dogs held down into firm engagement with the axle housings, the channel runners 82 and 84 are driven by the cylinder 108 back toward the discharge end. The total movement of the frame of the transfer mechanism is equal to the spacing between adjacent stations, so that the axle housings are each advanced to the next station. In this machine the spacing between stations is advantageously arranged to be 18 inches.

To hold the housings squarely in position, the transfer mechanism pauses with the dogs held down, while the next successive washing, scrubbing, rinsing, or drying operation takes place, as the case may be. Then the dogs 98 and 100 are swung up and the transfer frame is returned toward the intake end of the machine, and so forth.

In order to actuate the dogs 98 and 100 two rotatable shafts 112 and 114 extend the length of the transfer frame. These shafts have a diameter of 2½ inches and are journaled in pairs of bearings 116 and 118 secured underneath the cross braces. In a machine of this size we find that best performance is obtained by using at least eight cross braces 86 and at least eight pairs of bearings 116 and 118. Near each end of these shafts is located a hydraulic actuating assembly including a hydraulic cylinder 120 and piston. This machine uses a cylinder having a 2 inch diameter and a 4 inch stroke available commercially as a Hannifin 2" diameter x 4" stroke—Model (CBB–H10C) Cylinder. These cylinders 120 at each end of the transfer frame are connected by flexible hoses (not shown) to suitably controlled valves. Each cylinder 120 has a clevis 122 at one end which is swingably pinned to a knee-shaped lever 124 rigidly secured to a cylindrical mounting block 126 which is keyed and bolted to the shaft 112. A clevis 128 on the end of the piston rod is swingably pinned to another knee-shaped lever 130 similarly secured by a curved block 132 to the shaft 112.

When the piston rod is pulled into the cylinder, it rotates the shafts 112 and 114 to swing up the dogs into their disengaged dotted-line positions shown in Figure 3. When the piston rod pushes out it swings the dogs down to an angle of about 45° to the horizontal.

The engaging positions of the dogs are controlled by adjustable studs 134 which are struck by the knees 124 and 130. As shown in Figure 3 these studs can be adjustably screwed into stop blocks 136 welded onto the runners 82 and 84 and held in position by lock nuts as illustrated.

As can be seen most clearly in Figure 8, the forked dogs have semi-circular recesses and diverging mouths 138 to aid in sliding down into straddling position on the axle casings.

It is to be noted that the arms 14 and 15 are more closely spaced than the forked dogs 98 and 100 and thus these dogs can engage the ends of the axle casings 12 outside of these arms. Then, when the transfer mechanism moves to the right, it slides the axle housing out of these arms at position C. While the transfer mechanism is pausing in its discharge end position, the arms 14 and 15 swing over and engage the next axle housing at A and swing it into position C in readiness for the transfer mechanism. For increased production rates, two pairs of arms 14 and 15 spaced 180° apart or four pairs of these arms spaced 90° apart may be used to advantage on the cross frame 16. With such multiple pair of arms, the drive units 22 and 24 always rotate the cross frame 16 in the same direction, pausing at station C to unload from one pair of arms while the diametrically opposite pair of arms at station A is receiving another axle housing.

In order thoroughly ot wash, scrub out, and flush the axle housings, a number of nozzles are arranged in precisely predetermined relationship with respect to the units when in stations E, F, G, and H. In station E a nozzle 140 similar to that shown at 74 is directed up beside the center rail 32 to flush out the inside of the differential housing.

Then in station F a pair of nozzles 142 and 144 direct high pressure jets of washing solution into opposite ends of the axle casings 12 for initially flushing out any loose particles and for washing out any greases, waxes or similar coatings.

In station G a high pressure connection discharging a solid stream of washing liquid of large diameter is directed by a nozzle 146 into one end of the axle housing. In station H a similar stream is shot in by a nozzle 148.

For an enhanced cleaning action, stations I, J, and K are occupied by a pair of identical movable scrubbing and flushing carriages, generally indicated at 150 and 152. Referring to Figures 4, 5, 6 and 7, it is seen that the carriage 152 is supported between a pair of I-shaped tracks 154 and 156, which extend across the top of the machine and also support the other carriage 150. This carriage includes a rectangular chassis 158 having two sleeve bearings 160 projecting from each of its side frame members 162 near the corners. Tapered flanged rollers 164 ride in the channel troughs between the inner flanges of the tracks 154 and 156 and support the carriage by means of stub shafts 166 running in these sleeves 160. Down from this chassis is hung a rectangular frame 170 having a pair of upright members and a lower support plate 172 parallel with the tracks 30 and 34 in the machine.

Secured under the center of this support plate are a pair of spaced bearings 174 and 176 with a rotatable shaft 178 journaled in them and protecting in through a hole in the wall of the machine at station J and carrying a rotating scrubbing brush 180 chucked in its inner end. To move the carriage, a hydraulic cylinder 182 is supported on a pair of cross braces 183 secured to the tracks 154 and 156. It has a 2 inch diameter and provides a total of 27 inches of travel for the carriage. Its piston rod is pinned at 184 to an upstanding clevis arm rigidly secured to a cross brace in the chassis 158.

During the time that the axle housings are being held stationary by the transfer mechanism, the rotating brush 180 is driven by the hydraulic cylinder 182 so as to run into the tubular casing 12. At the same time, a pair of nozzles 186 direct jets of washing liquid up through the cover plate opening into the differential housing 11 at angles of about 30° with respect to the horizontal. These liquid jets are aimed so that substantially all of the liquid passes into the inner ends of the tubes 12 which advantageously keeps each brush 180 saturated with liquid for most effective cleaning. The impact of the liquid also helps dislodge and dissolve the particles and soil coatings.

In order to rotate the scrubbing brush 180 a 1 horse power 1800 r.p.m. motor 188 is supported in the chassis 158 on an adjustable platform 190 having one edge hinged at 191. The motor has a V-belt drive pulley 192 of 4 inch pitch diameter driving a pulley 194 of 9 inch pitch diameter on the outer end of the shaft 178. Thus, the brush 180 is desirably rotated at about 800 r.p.m. Belt tension is adjusted by a clevis bolt engaging a slot in the platform with a pair of lock nuts, as illustrated.

Projecting in from either end of the support plate 172 are a pair of hollow flushing mandrels 196 and 198 which are aligned with the bores of the tubular axle casings in stations I and K, respectively. These flushing mandrels each have an outside diameter slightly smaller than the inner diameter of the tubular casings 12 and include conical jet directors 200 spaced out from their nozzle ends. Washing solution under high pressure is supplied to the outer ends of these flushing mandrels from a manifold connected to the pump 60 through flexible hose connections (not shown). The high velocity spray passing by the perimeter of this director strikes the soil material with a tangential impact action which is very effective in cleaning these tubular passages.

In station L a high pressure jet of washing liquid is directed by a nozzle 204 up into the interior of the differential housing for further dissolving and flushing action. In stations L and M a pair of nozzles 205 and 206, respectively, are aligned with the bores in the axle housing and produce a final washing and flushing action.

It is to be understood that the washing stations C through M contain many nozzles directed downwardly and directed at angles inwardly from the two sides of the machine so as to focus on the outside surfaces of the axle housings. They are mounted on pipes fed from high pressure manifolds supplied from the pump 60. Their mounting arrangement on the pipes is generally similar to the arrangement described in the copending application Serial No. 467,746, rescribed above. A particularly desirable adjustable nozzle for this use is described and claimed in the copending application Serial No. 462,726, filed October 18, 1954 in the names of Umbricht and Evans. The nozzle 74 is of this adjustable form.

Where an extremely high impingement force is desired for the nozzles 140, 142, 144, 146, 148, 186, 204, 205, and 206 in stations E, F, G, H, J, L, and M, respectively, and the mandrels 196 and 198, they are supplied from a separate higher pressure source. Most conveniently this is a higher pressure second stage in the pump 60. In this case the pump includes two impellers and two outlets. One outlet supplies most of the nozzles while the second outlet at higher pressure supplies those listed above.

In order to flip the axle housings back into their initial positions as they move through station Y into station Z, the center track 32 is ended. A swingable flip-over arm 208 is placed mid-way between the tracks 30 and 34. A projecting hook 210 on the upper end of this arm catches over the approaching edge of the differential housing near the cover plate surface 13. This arm is pivoted as it passes over the pivot. This hook then pulls down on the front edge of the surface 13 and flips the axle housing over. A large weight at the lower end of the arm 208 swings it back to vertical position after each unit passes over.

The operation of the rinse and dry section of this illustrative embodiment of the present invention are not described in detail herein for these portions of the machine do not embody any aspects of the present invention, except for the transfer mechanism which extends throughout the full length of the machine and passes through the rinse and dry sections. This transfer mechanism is illustrated and described in detail in connection with Figures 1, 2, 3 and 8. The rinse section of this machine is generally similar to the washing section, for it includes suitably positioned nozzles fed under high pressure through manifolds and pipes with rinsing solution supplied from a second pump identical with the pump 60 and positioned in a side tank 202 adjacent the right end of the side tank 64 in Figures 1 and 2. An understanding of the arrangement of th blower, air manifolds, and air nozzles in the drying section of the machine will be understood from a review of the operation of the drying sections in the machines shown in the copending applications Serial No. 462,726, filed October 18, 1954 and Serial No. 467,746, filed November 9, 1954, both filed jointly in the names of two of the present inventors, Emil Umbricht and Dewey Evans.

From the foregoing it will be understood that the embodiment of the present invention described above is well suited to provide the advantages set forth, and since many possible embodiments may be made of the various features of this improved power washing apparatus, and as the apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, or without departing from the scope of the invention.

What is claimed is:

1. Improved power washing apparatus adapted for automatically handling and washing fabricated parts in sequence comprising a track running through the apparatus for guiding parts thereon through the apparatus, a plurality of washing stations at uniformly spaced points along said track, a transfer mechanism having a rotatable shaft extending parallel to and spaced from said track, a plurality of arms secured to said shaft at uniformly spaced points, the spacing between said arms being equal to the spacing between said stations, said arms all lying in a common plane, reciprocating drive mechanism coupled to said shaft and reciprocating said shaft longitudinally parallel with said track a distance substantially equal to the spacing between said arms, power driven rotating drive mechanism on said transfer mechanism rotating said arms into a first angular position to engage the parts on said track when said shaft is moved in one direction to advance the parts along said track by an amount equal to said distance between successive stations, and rotating said arms into a second angular position to clear the parts on said track when said shaft is returned longitudinally in the opposite direction to its initial position.

2. Improved power washng apparatus adapted for automatically handling and washing fabricated parts having an elongated configuration comprising a pair of spaced parallel rails running through the apparatus for guiding parts arranged transversely thereon through the apparatus in sequence, a transfer mechanism having a pair of power driven rotatable shafts extending parallel to and spaced from said rails, a plurality of arms secured to each of said shafts at uniformly spaced corresponding points, said arms on each shaft all lying in a common plane, reciprocating drive mechanism coupled to said shafts and reciprocating said shafts in synchronism longitudinally parallel with said rails a distance substantially equal to the spacing between said arms, rotating drive mechanism rotating each of said arms into first angular positions for respective pairs of said arms to engage each of the parts on said rails while said shafts are moved in one direction to advance the parts along said rails an amount equal to said distance, and rotating said arms into second angular positions to clear the parts on said rails while said shafts are returned in the opposite direction to their initial postions, and washing mechanism at spaced points along said rails, the distance between said spaced points being equal to the spacing between said arms whereby said parts are advanced step-by-step along said rails and washed.

3. Improved power washing apparatus as claimed in claim 2 and wherein said fabricated parts have a configuration such as axle housings, and the like, said apparatus including loading mechanism having a pair of spaced bifurcated arms adapted to receive opposite ends of said parts therein in an initial position, revolving drive means coupled to said arms and swinging said arms about a pivot axis from said initial position upwardly and over said axis and down toward said rails, a third arm in said loading mechanism engaging the center sections of said parts to prevent their turning over while held in said bifurcated arms, and guide means between said rails to prevent said parts from turning over when unloaded from said arms and slid along said rails by said transfer mechanism.

4. Improved power washing apparatus adapted for automatically handling and washing articles comprising a track running through the apparatus for guiding the articles thereon through the apparatus, a transfer mechanism having a rotatable shaft extending parallel to and spaced from said track and being adapted to straddle a portion of said articles lying on said track, a plurality of forked dogs secured to said shaft at uniformly spaced points, said forked dogs all lying in a common plane, reciprocating drive mechanism coupled to said shaft and reciprocating said shaft longitudinally parallel with said track a distance substantially equal to the spacing between said forked dogs, rotating drive mechanism on said transfer mechanism rotating said dogs down into a first angular position straddling the respective articles spaced along said track while said shaft is moved in one direction to advance the articles along said track an amount equal to said distance, and rotating said dogs into a second angular position to clear the parts on said track when said shaft is returned in the opposite direction toward its initial position, and washing mechanism arranged along said track at a plurality of stations having a spacing equal to the spacing between said forked dogs, whereby said articles are intermittently advanced in sequence along said track and washed.

5. Improved power washing apparatus as claimed in claim 4 and wherein each article has at least one elongated passage therein extending transversely to the direction of motion of said articles along said track, a rail extending perpendicularly to said track, a carriage mounted on said rail for longitudinal motion toward and away from said track, a second rotatable shaft on said carriage and projecting toward the passage in an article on said track at a predetermined position, a brush mounted on said second shaft, one of the forked dogs of said transfer mechanism holding each article in succession in said predetermined position, second rotating drive mechanism on said carriage coupled to said second shaft for rotating said brush and second reciprocating drive mechanism coupled to said carriage for driving said brush into the opening of an article in said position.

6. Improved power washing apparatus adapted for automatically handling and washing fabricated parts comprising a pair of spaced parallel rails running through the apparatus for guiding parts thereon through the apparatus, a transfer mechanism including a frame mounted in said washing apparatus for longitudinal motion parallel with said rails and having a pair of rotatable shafts mounted thereon extending parallel to and spaced from said rails, a plurality of arms secured to said shafts at uniformly spaced points, said arms all lying in a common plane, reciprocating drive mechanism coupled to said frame and reciprocating said frame and said shafts longitudinally parallel with said rails a distance substantially equal to the spacing between said arms, rotating drive mechanism on said frame rotating said arms into a first angular position to engage the parts on said rails while said frame is moved in one direction to advance the parts along said rails an amount equal to said distance, and rotating said arms into a second angular position to clear the parts on said rails when said frame is returned in the opposite direction to its initial position, and washing mechanism arranged near said rails at a plurality of spaced positions spaced apart distances equal to the spacing between said arms, whereby said articles are advanced step-by-step through said apparatus and washed.

7. Improved power washing apparatus as claimed in claim 6 adapted for handling rear axle housings, and the like, said articles being spanned across between said rails, and a third rail between said parallel rails adapted to engage the center section of said articles and preventing their turning over.

8. Improved power washing apparatus as claimed in claim 6 adapted for handling rear axle housings, and the like, said articles being spanned across between said rails, a third rail between said parallel rails adapted to engage the center portions of said articles and preventing their rolling along said parallel rails, and a turn-over mechanism for said articles comprising a pivoted arm adjacent to an end of said third rail and between said parallel rails and having a hook on its upper end adapted to engage the leading edge of the center portion of said articles, and a pivot for said lever below the plane of said parallel rails, whereby as each article advances beyond the end of said third rail it is hooked by said lever and rolled over.

9. Improved power washing apparatus adapted for automatically handling and washing elongated articles comprising guide means extending through the apparatus for guiding said elongated articles thereon through the apparatus with said articles lying generally transversely to the direction of motion along said guide means, a transfer mechanism including a frame mounted in said washing apparatus for longitudinal motion parallel with the direction of motion along said guide means and having a pair of rotatable shafts mounted thereon and also extending parallel to said direction of motion and being spaced above said guide means, a plurality of forked dogs secured to each of said shafts at spaced points, said dogs on each shaft lying in common planes, and respective dogs on each shaft forming pairs adapted to straddle opposite ends of said articles, longitudinal drive mechanism coupled to said frame and driving said frame and said shafts longitudinally parallel with said direction of motion a distance substantially equal to the spacing between said arms, rotating drive mechanism on said frame rotating said shafts into corresponding angular positions for said dogs to straddle opposite ends of the articles on said guide means while said frame is moved in one direction to advance the articles along said guide means, and rotating said arms into second corresponding angular positions with said dogs clearing the articles on said guide means while said frame and shafts are returned by said longitudinal drive mechanism in the opposite direction toward their initial position, and washing mechanism arranged near said guide means at a plurality of spaced positions spaced apart distances equal to the spacing between said arms, whereby said articles are advanced step-by-step through said apparatus and washed.

10. Improved power washing apparatus as claimed in claim 9 and including a loading mechanism adapted to turn the articles over and load them into the apparatus, said loading mechanism having a pair of spaced bifurcated arms secured to a rotatable cross member extending transversely to said guide means near its intake end and being rotatable about its longitudinal axis, drive means rotating said cross member from an initial position with said bifurcated arms extending away from said guide means and adapted to receive opposite ends of the elongated articles therein and rotating said cross member into a second position with said bifurcated arms extending toward said guide means, said arms being spaced differently from the spacing between respective sets of dogs on said shafts, the first dog on each shaft straddling the article in said bifurcated arms when said cross member of the loading mechanism is in said second position and removing it therefrom when the transfer frame is driven longitudinally.

11. Improved power washing apparatus as claimed in claim 9 and wherein each of said shafts includes a lever arm at corresponding points, and a piston and cylinder mechanism between said shafts pivotally secured to each of said levers for rotating said shafts, and motion-limiting means secured to each of said shafts.

12. Improved power washing apparatus as claimed in claim 11 and wherein said motion limiting means arrests said shafts with the forked dogs on both shafts projecting downwardly at corresponding angles with respect to the horizontal.

13. Improved power washing apparatus adapted for automatically handling and washing fabricated parts having an elongated configuration comprising a pair of spaced parallel rails running through the apparatus for guiding parts thereon through the apparatus, said parts being arranged transversely on said rails, a transfer mechanism having a pair of rotatable shafts extending parallel to and spaced from said rails, a plurality of forked dogs secured to each of said shafts at uniformly spaced points, each of the dogs on one shaft corresponding with those on the other shaft and forming respective pairs therewith, said dogs on each arm all lying in a common plane, reciprocating drive mechanism coupled to said shafts and reciprocating said shafts in synchronism longitudinally parallel with said rails a distance substantially equal to the spacing between said dogs, rotating drive mechanism rotating respective pairs of said dogs into first angular positions to straddle opposite ends of the parts lying transversely on said rails while said shafts are moved in one direction to advance the parts along said rails an amount equal to said distance, and rotating said dogs into second angular positions to clear the parts on said rails when said shafts are returned in the opposite direction to their initial position, and washing mechanism at spaced points along said rails constituting washing stations spaced at intervals equal to the spacing between said dogs, whereby said parts are advanced step-by-step along said rails and washed.

14. Improved power washing apparatus adapted for automatically handling and washing a plurality of articles and for advancing in sequence the articles through the apparatus comprising supporting and guide means running through the apparatus for guiding the elongated articles through the apparatus with the articles on said supporting and guide means, said supporting and guide means having a plurality of washing stations uniformly spaced therealong, a transfer mechanism arranged to advance said articles along said supporting and guide means and arresting said articles and holding them for predetermined periods of time in each of said stations, said transfer mechanism including an elongated rotatable shaft extending generally parallel to and spaced from said supporting and guide means, article advancing and holding means secured to said shaft at uniformly spaced points and all lying in a common plane and having first surfaces adapted to push the articles along said supporting and guide means and having second surfaces ahead of said articles restraining them and third surfaces adapted to bear on said articles and clamp them against said supporting and guide means, reciprocating drive mechanism coupled to said shaft and reciprocating said shaft longitudinally parallel with said supporting and guide means a distance substantially equal to the distance between stations, rotating drive mechanism rotating said shaft and bringing said article holding and advancing means into a first angular position with said respective surfaces engaging respective articles along said supporting and guiding means while said shaft is being moved in one direction to advance the articles along said rails an amount equal to said distance, said reciprocating drive mechanism pausing at the end of a stroke advancing articles along said supporting and guiding means and said rotating drive means holding said surfaces in engagement with said articles during said pause to hold said articles aligned with said stations, said rotating drive means then rotating said advancing and holding means into a second angular position free of the articles on said supporting and guide means when said shaft is returned in the opposite direction toward its initial position.

15. In apparatus of the type described for automatically washing fabricated parts and including washing means synchronously operative with parts transfer and guide means, an improved transfer and guide means combination comprising a track aligned in a rectilinear direction for guiding parts placed thereon, a transfer device including a pair of spaced, power driven, rotatable parallel shafts extending parallel to and spaced from said track, a plurality of arms on each shaft secured to said shafts at uniformly spaced corresponding points on each shaft, said arms on each shaft all being in a common plane, reciprocating drive apparatus connected to said shafts whereby said shafts are driven in a longitudinally reciprocating manner synchronous with the rotation of said shafts so that said arms are in a first position depressed towards said track when the shafts are driven in one direction and said arms are rotated into a second and raised position away from said track when the shafts are driven in the return direction.

16. In apparatus of the type described for automatically washing fabricated parts and including washing means synchronously operative with parts transfer and guide means, an improved transfer and guide means combination as described in claim 15 wherein said arms are bifurcated at their unattached ends.

17. In apparatus of the type described for automatically washing fabricated parts and including washing means synchronously operative with parts transfer and guide means, an improved transfer and guide means as described in claim 15 wherein said track includes a pair of spaced rails.

References Cited in the file of this patent
UNITED STATES PATENTS

| | | |
|---|---|---|
| 1,904,608 | Bettini | Apr. 18, 1933 |
| 1,926,034 | Camerota | Sept. 13, 1933 |
| 2,108,227 | Ladewig et al. | Feb. 15, 1938 |
| 2,494,380 | Ellig | Jan. 10, 1950 |
| 2,636,201 | Varga | Apr. 28, 1953 |
| 2,642,179 | Cross | June 16, 1953 |
| 2,648,342 | Vani et al. | Aug. 11, 1953 |
| 2,674,760 | Finch | Apr. 13, 1954 |
| 2,681,136 | Ipsen | June 15, 1954 |
| 2,698,624 | Peters | Jan. 4, 1955 |
| 2,754,534 | Varga | July 17, 1956 |
| 2,815,127 | Edgecombe | Dec. 3, 1957 |